United States Patent
Nishimura et al.

(10) Patent No.: US 8,894,395 B2
(45) Date of Patent: Nov. 25, 2014

(54) COMPRESSOR

(75) Inventors: Yusuke Nishimura, Utsunomiya (JP); Kazuaki Higuchi, Utsunomiya (JP); Satsuki Muraoka, Utsunomiya (JP); Hiroki Kuwata, Utsunomiya (JP)

(73) Assignee: Keihin Corporation, Tokyo (JP)

( * ) Notice: Subject to any disclaimer, the term of this patent is extended or adjusted under 35 U.S.C. 154(b) by 226 days.

(21) Appl. No.: 13/435,599

(22) Filed: Mar. 30, 2012

(65) Prior Publication Data

US 2012/0251301 A1 Oct. 4, 2012

(30) Foreign Application Priority Data

Mar. 30, 2011 (JP) ................................. 2011-075187

(51) Int. Cl.
*F01C 19/00* (2006.01)
*F04C 18/02* (2006.01)
*F04C 27/00* (2006.01)

(52) U.S. Cl.
CPC ......... *F04C 18/0215* (2013.01); *F04C 2240/50* (2013.01); *F04C 27/009* (2013.01)
USPC ............................ 418/104; 418/259; 418/270

(58) Field of Classification Search
USPC ................... 418/259, 270; 384/465; 417/212
See application file for complete search history.

(56) References Cited

U.S. PATENT DOCUMENTS

| 4,655,617 A * | 4/1987 | Yasui et al. ................... 384/465 |
| 2004/0202550 A1* | 10/2004 | Kawaguchi et al. .......... 417/212 |

FOREIGN PATENT DOCUMENTS

| JP | 2003-214339 A | 7/2003 |
| JP | 2004-092785 A | 3/2004 |
| JP | 2010-216302 A | 9/2010 |

* cited by examiner

*Primary Examiner* — Thomas Denion
*Assistant Examiner* — Thomas Olszewski
(74) *Attorney, Agent, or Firm* — Westerman, Hattori, Daniels & Adrian, LLP

(57) ABSTRACT

A front housing configuring a scroll compressor is provided in its shaft hole with a first bearing, and the front housing rotatably supports a rotation shaft. The first bearing includes a ball bearing having a plurality of balls. First and second seal rings and are provided between an outer ring fixed to the front housing and an inner ring which abuts against an outer peripheral surface of the rotation shaft. A first seal ring disposed on the side of one side surface of the outer ring is provided such that the first seal ring is in non-contact with the inner ring, and the second seal ring disposed on the side of the other side surface of the outer ring abuts against the inner ring.

3 Claims, 4 Drawing Sheets

COMPRESSOR

TECHNICAL FIELD

The present invention relates to a compressor used for a vehicular air conditioner for compressing a refrigerant therein by a driving force.

The present application claims priority to Japanese Patent Application No. 2011-075187 filed in Japan on Mar. 30, 2011, and contents thereof are incorporated herein.

BACKGROUND OF THE INVENTION

A conventional compressor which compresses fluid such as a refrigerant includes a fixed scroll having a scroll fixed wall in a housing, a movable scroll disposed such that a scroll movable wall is engaged with the fixed wall, and a rotation shaft to which a rotation force is given utilizing a driving force of an internal combustion engine. A crankpin of the rotation shaft which is eccentric in its radial direction is engaged with the movable scroll, the rotation force of the rotation shaft is transmitted to the movable scroll through the crankpin, thereby turning the movable scroll, and fluid is compressed in a compression chamber formed between the fixed scroll and the movable scroll.

This compressor includes an oil seal in slide contact with an outer peripheral surface of the rotation shaft to prevent the fluid and lubricant from leaking out, and a bearing which rotatably supports the rotation shaft. A ball bearing is used as the bearing. The ball bearing includes an annular outer ring held by a housing, an annular inner ring which abuts against the outer peripheral surface of the rotation shaft and a plurality of balls provided between the outer ring and the inner ring (see Japanese Patent Application Laid Open No. 2003-214339 for example).

SUMMARY OF THE INVENTION

The bearing used in such a compressor is provided with a pair of seal members between the outer ring and the inner ring to cover the balls for the purpose of preventing lubricant used for lubricating the balls and the like from leaking outside for example. In this case, a space between the bearing and the oil seal in the housing is tightly closed with the oil seal and the seal members.

However, a tiny amount of refrigerant in the housing enters the space through the oil seal, a temperature in the space rises due to the rotation of the rotation shaft, and if the refrigerant which entered the space expands with the temperature rise and a pressure therein rises, a high pressure of the refrigerant cannot be released to the outside and the pressure is applied to the seal member of the bearing. As a result, the seal member of the bearing is pressed and deformed, and the seal member falls out from between the outer ring and the inner ring in some cases. When the seal member falls out, the sealing property in the bearing cannot be maintained, there is a possibility that moisture and dust enter the bearing from outside, the rotation shaft-supporting function of the bearing is deteriorated, a lubricant in the bearing leaks to the outside, the lubricant attaches to a clutch unit which controls transmission of a driving force from the internal combustion engine to the compressor, and the clutch unit slips.

In Japanese Patent Application Laid Open No. 2003-214339, a communication passage which brings an interior of a boss and the outside into communication with each other is formed in the rotation shaft and the boss portion so that a pressure in the boss is released outside through the communication passage.

However, in order to provide the communication passage in the vicinity of the boss, it is necessary to carry out a mechanical machining operation, and after the mechanical machining operation, it is necessary to remove burrs to prevent the seal members of the oil seal and the bearing from being damaged. This increases the number of producing steps and producing cost.

Further, since the communication passage is always open, there is a possibility that water and dust enter the housing from the outside through the communication passage, and if it is used for a compressor for a vehicular air conditioner which is provided outside a passenger room, this possibility is further increased.

A compressor is provided which is capable of preventing a seal member from falling out due to variation in an internal pressure and which inexpensively achieves a structure capable of maintaining lubricating performance by the seal member.

The compressor comprises a housing, a compressing portion which is provided in the housing and which compresses a refrigerant, a rotation shaft which is connected to the compressing portion and which drives the compressing portion, a clutch unit which is connected to one end of the rotation shaft and which transmits power to the rotation shaft or cuts off the transmission of the power to the rotation shaft, a boss portion which is provided in the housing on the side of the clutch unit and which is provided at its inner side with a hole into which the rotation shaft is inserted, a sealing member which is provided on the boss portion on the side of the compressing portion, which comes into contact with the rotation shaft and which shields the housing and the boss portion from each other, and a bearing which rotatably holds the rotation shaft with respect to the housing.

The bearing includes an outer ring which is provided on an end of the boss portion on the side of the clutch unit and which is attached to the hole, an inner ring which is provided on the outer ring on the side of its inner periphery and which abuts against an outer peripheral surface of the rotation shaft, and a plurality of balls for rotatably supporting the inner ring with respect to the outer ring and being provided between the outer ring and the inner ring. The bearing further includes a first seal member which is provided between the outer ring and the inner ring and which is attached to an end surface of the bearing on the side of the sealing member, and a second seal member which is provided between the outer ring and the inner ring, which is attached to an end surface of the bearing on the side of the clutch unit and which is exposed outside of the housing, the first seal member is always in non-contact with the inner ring and the second seal member is in contact with the inner ring.

In the compressor having the bearing which rotatably supports the rotation shaft, there are provided, between the outer ring and the inner ring of the bearing, the first seal member which is always in non-contact with the inner ring and which is provided on the side of the sealing member, and the second seal member which comes into contact with the inner ring and which is provided on the side of the clutch unit. Therefore, even when a refrigerant in a space in the boss portion located between the bearing and the sealing member is heated and expanded by rotation of the rotation shaft and pressure of the refrigerant becomes high, the refrigerant flows inside through a space between an inner edge of the first seal member and the inner ring, the refrigerant presses the second seal member toward the outside of the housing, the contacted state between the second seal member and the inner ring is released and the refrigerant is discharged outside of the housing through the gap.

Hence, even when internal pressure in the space in the boss portion is varied, it is possible to avoid a case where excessive pressure is applied to the first and second seal members of the bearing, and these seal members fall out from the inner ring and the outer ring, and it is possible to reliably prevent lubricant from leaking out from the bearing by the first and second seal members. As a result, lubricating performance of the bearing by the lubricant can stably be maintained inexpensively with a simple configuration, and the rotation shaft can reliably and stably be supported over the long term. It is also possible to prevent dust and the like from entering the bearing from outside.

It is preferable that when pressure in the space in the boss portion becomes higher than a given value, a portion on the side of the inner ring tilts outward of the housing and the contacted state between the second seal member and the inner ring is released.

It is preferable that pressure in the boss portion when a portion of the second seal member on the side of the inner ring tilts is set within a range of 1/20 to 1/5 of elastic limit pressure of the second seal member.

It is preferable that the rotation shaft is provided with a shielding member such that the shielding member faces a contact portion between the second seal member and the inner ring at a location closer to the clutch unit than the bearing.

In the compressor having the bearing which rotatably supports the rotation shaft, there are provided, between the outer ring and the inner ring of the bearing, the first seal member which is always in non-contact with the inner ring and which is provided on the side of the sealing member, and the second seal member which comes into contact with the inner ring and which is provided on the side of the clutch unit. Therefore, even when a refrigerant in a space in the boss portion located between the bearing and the sealing member is heated and expanded by rotation of the rotation shaft and pressure of the refrigerant becomes high, the refrigerant flows inside through a space between an inner edge of the first seal member and the inner ring, the refrigerant presses the second seal member toward the outside of the housing, the contacted state between the second seal member and the inner ring is released and the refrigerant is discharged outside of the housing through the gap. As a result, it is possible to avoid a case where excessive pressure is applied to the first and second seal members, and these seal members fall out from the inner ring and the outer ring, it is possible to reliably prevent lubricant from leaking from the bearing by the first and second seal members, and lubricating performance of the bearing by the lubricant can stably be maintained inexpensively with a simple configuration.

BRIEF DESCRIPTION OF THE DRAWINGS

FIGS. 3A and 3B are enlarged sectional views of a portion of the first bearing shown in FIG. 2 in the vicinity of a second seal ring, wherein FIG. 3A shows a state before the second seal ring tilts and FIG. 3B is an enlarged sectional view showing a state where the second seal ring tilts.

DETAILED DESCRIPTION OF THE INVENTION

A compressor of the present invention will be described in detail with reference to the accompanying drawings based on a preferred embodiment.

Figure 1:
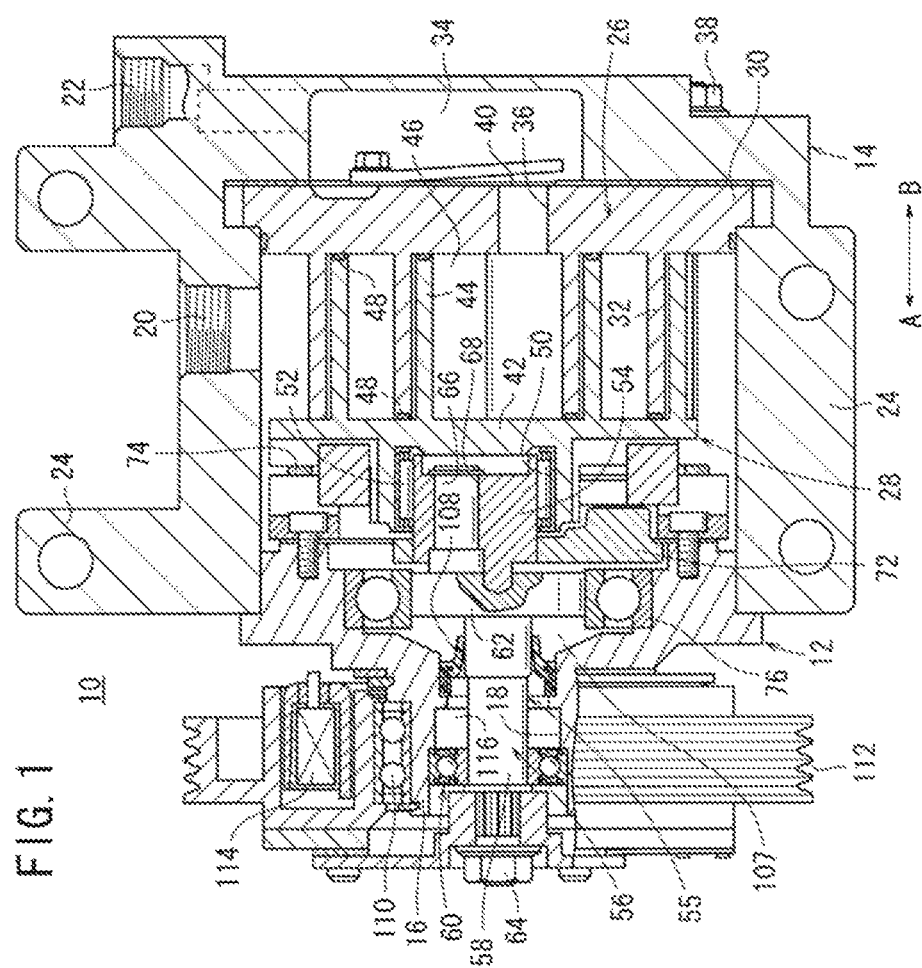
FIG. 1 is a partially omitted sectional view of an entire scroll compressor which is one example of a compressor according to an embodiment.

In FIG. 1, a reference symbol 10 represents a scroll compressor which is one example of a compressor according to an embodiment.

As shown in FIG. 1, this scroll compressor 10 includes a lid-shaped front housing (housing) 12 and a cup-shaped rear housing 14. The front housing 12 includes a boss portion 16 which projects toward one end of the front housing 12. A shaft hole 18 is formed in the boss portion 16 such that the shaft hole 18 penetrates the boss portion 16 along an axial direction (directions of arrows A and B) thereof. A shaft portion 58 of a later-described rotation shaft 56 is inserted into the shaft hole 18.

A suction port 20 is formed in an upper portion of the rear housing 14, and refrigerant gas is introduced into the rear housing 14 through the suction port 20. The suction port 20 opens at an outer peripheral surface of the rear housing 14, the suction port 20 penetrates the rear housing 14 toward its center and the suction port 20 is in communication with an interior of the rear housing 14. A discharge port 22 is formed in the upper portion of the rear housing 14, compressed gas which is refrigerant gas compressed by the scroll compressor 10 is discharged to a refrigerant circulation system (not shown) through the discharge port 22. The rear housing 14 is provided with a plurality of mounting portions 24 for mounting the scroll compressor 10 on an engine or an external device (both not shown) for example.

A fixed scroll 26 and a movable scroll 28 which turns with respect to the fixed scroll 26 are inserted into the rear housing 14 from its one opened end (the direction of arrow A).

The fixed scroll 26 includes a fixed-side board portion 30 having an outer peripheral edge connected to the rear housing 14, and a fixed-side scroll wall 32 standing from the fixed-side board portion 30 toward the movable scroll 28 (direction of arrow A) in a scroll shape. The fixed-side board portion 30 is disposed in the rear housing 14 on the side of the other end (direction of arrow B).

A gas discharge chamber 34 which is in communication with the discharge port 22 is formed between a back surface of the fixed scroll 26 and the rear housing 14. A compressed gas lead-out hole 36 which is in communication with the gas discharge chamber 34 from a later-described gas compression chamber 46 is formed in a substantially center portion of the fixed-side board portion 30. The fixed-side board portion 30 is connected to the rear housing 14 through a plurality of fastening bolts 38.

A discharge valve 40 is provided on a back surface of the fixed-side board portion 30. The discharge valve 40 closes the compressed gas lead-out hole 36, and when a pressure of compressed gas which is compressed in the gas compression chamber 46 becomes equal to predetermined pressure, the discharge valve 40 opens to lead the compressed gas to the gas discharge chamber 34.

The movable scroll 28 includes a movable-side board portion 42 and a movable-side scroll wall 44. The movable-side scroll wall 44 stands from the movable-side board portion 42 in a scroll shape and is engaged with the fixed-side scroll wall 32.

The movable-side scroll wall 44 is disposed in the rear housing 14 on the side of the fixed scroll 26 (direction of arrow B). The gas compression chamber 46 is formed by the fixed-side board portion 30 and the fixed-side scroll wall 32 which configure the fixed scroll 26, and by the movable-side board portion 42 and the movable-side scroll wall 44 which configure the movable scroll 28. To seal the gas compression chamber 46, seal members 48 are attached to ends of the fixed-side scroll wall 32 and the movable-side scroll wall 44 such that the seal members 48 slide on the movable-side board portion 42 and the fixed-side board portion 30.

A circular recess 50 is formed in a central portion of the movable-side board portion 42 such that the recess 50 opens on the side of a front surface of the movable-side board portion 42. A bush 54 is rotatably fitted into the recess 50 through a slewing bearing 52.

A driving portion 55 includes the rotation shaft 56 and the bush 54 which is connected to the other end of the rotation shaft 56. The shaft portion 58 formed on one end of the rotation shaft 56 is inserted into the shaft hole 18 of the front housing 12. A first bearing 60 which is a ball bearing, for example, is provided in the shaft hole 18, and the first bearing 60 rotatably supports the shaft portion 58 of the rotation shaft 56.

The rotation shaft 56 includes the shaft portion 58 having a constant diameter, and a support body 62 which is provided on an end of the shaft portion 58 and which has an increased diameter. The shaft portion 58 is disposed on the side of one end (direction of arrow A) of the front housing 12, and the support body 62 is disposed on the side of the other end (direction of arrow B) of the front housing 12 which is on the side of the fixed scroll 26. A later-described electromagnetic clutch (clutch unit) 114 is connected to one end of the shaft portion 58 through a bolt 64.

A crankpin 66, which is eccentric from an axis of the support body 62, projects from an end surface of the support body 62 toward the movable scroll 28 (direction of arrow B). The crankpin 66 is inserted into an eccentric hole 68, which is eccentric from an axis of the bush 54. A locking ring is attached to an end of the crankpin 66, thereby preventing the bush 54 from falling out from the crankpin 66.

Since the crankpin 66 is inserted into the eccentric hole 68, the bush 54 is swingably turned by the rotation shaft 56. According to this, the movable scroll 28 turns while varying a turning radius. A balance weight 72 is attached to the vicinity of a root portion of the crankpin 66 through the bush 54. A thrust plate 74 is provided between the movable-side board portion 42 of the movable scroll 28 and a support surface formed in the front housing 12. The thrust plate 74 slidably supports the movable scroll 28 by means of its sliding surface. The support body 62 is rotatably supported by a second bearing 76 provided in the front housing 12.

Figure 2:
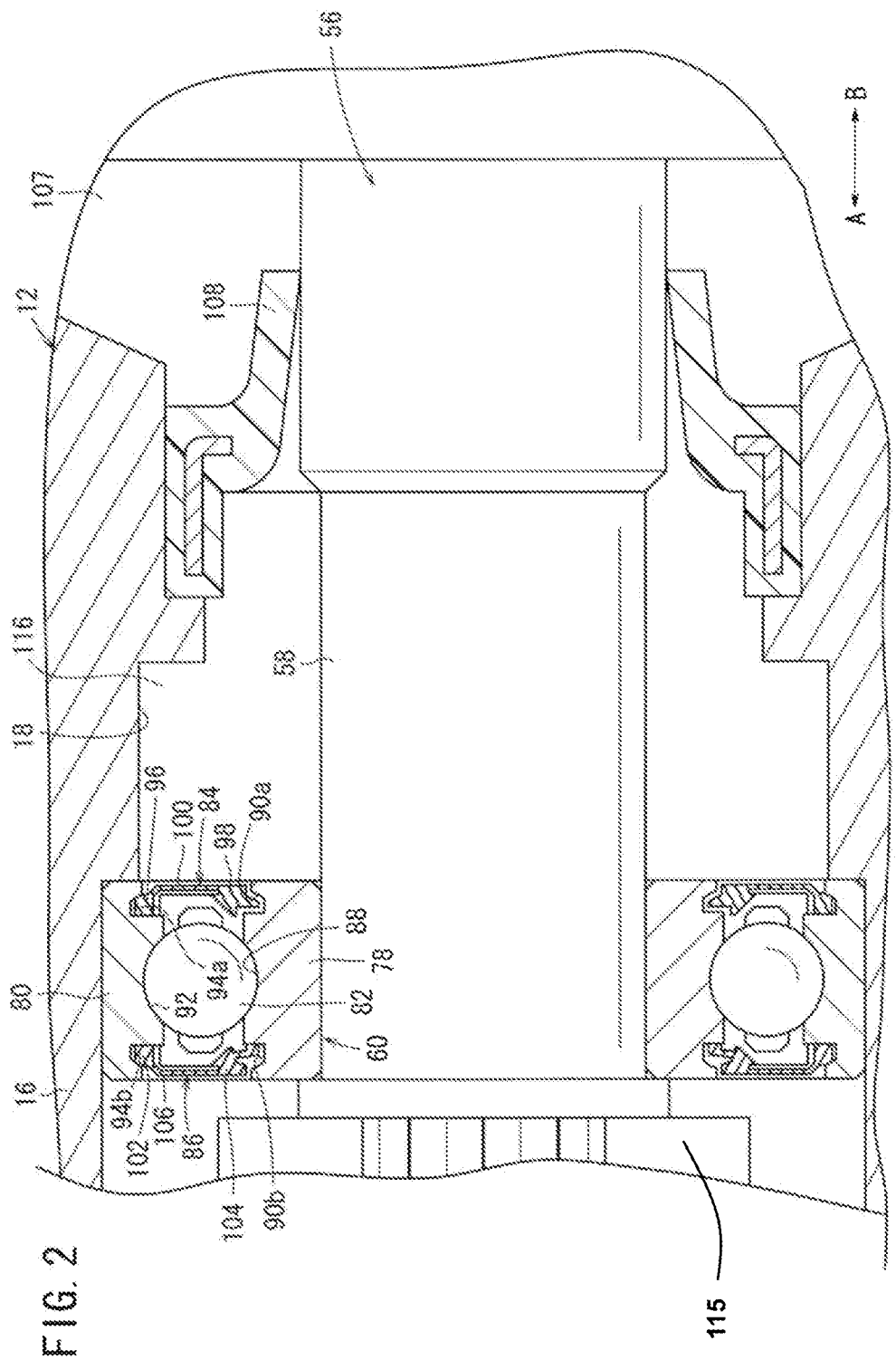
FIG. 2 is an enlarged sectional view of a portion of the compressor shown in FIG. 1 in the vicinity of a first bearing.
Figure 3A:
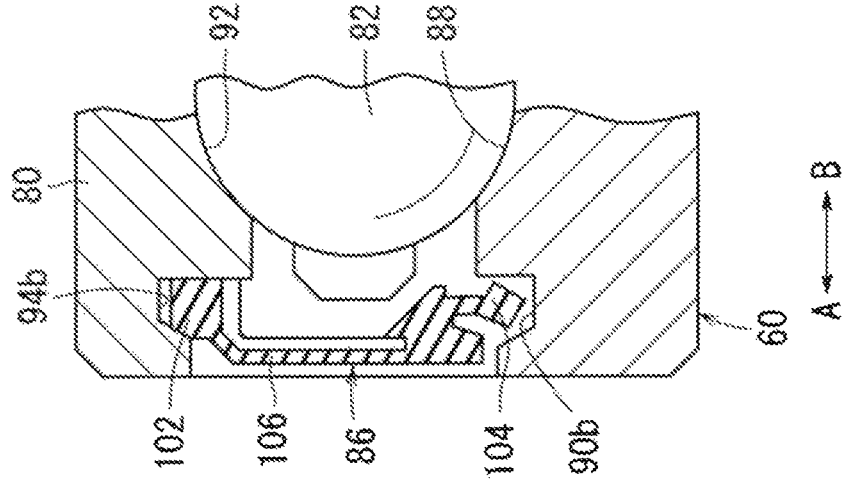
Figure 3B:
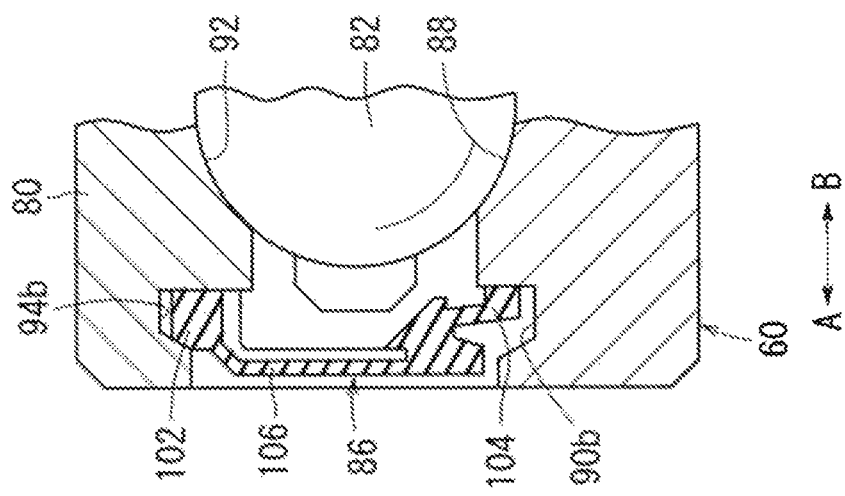

As shown in FIGS. 2, 3A and 3B, the first bearing 60 includes an annular inner ring 78 which abuts against an outer peripheral surface of the shaft portion 58, an annular outer ring 80 which is provided on the side of an outer periphery of the inner ring 78 and which abuts against an inner peripheral surface of the shaft hole 18, a plurality of balls 82 provided between the inner ring 78 and the outer ring 80, a first seal ring 84 provided on the side of one side surface (direction of arrow B), and a second seal ring 86 provided on the side of the other side surface (direction of arrow A) along axial directions of the inner ring 78 and the outer ring 80. The first bearing 60 is disposed in the housing such that one side surface of the inner ring 78 and the outer ring 80 faces the side of the fixed scroll 26 and the movable scroll 28 (direction of arrow B).

An inner peripheral surface of the inner ring 78 has a flat cross section, and this inner peripheral surface abuts against the shaft portion 58 of the rotation shaft 56. A first ball groove 88 is formed in a substantially central portion of an outer peripheral surface of the inner ring 78. A cross section of the first ball groove 88 is recessed in a semicircular shape, and a portion of the ball 82 is inserted into the first ball groove 88. A set of first groove portions 90a and 90b are respectively formed in one side surface and the other side surface of the inner ring 78. The first groove portions 90a and 90b are recessed by predetermined depths from the outer peripheral surface and open at the one side surface and the other side surface. Inner peripheral portions of the first and second seal rings 84 and 86 are inserted into the first groove portions 90a and 90b. A boss 115 is disposed on the side of an opening of the first groove portion 90b such that the boss 115 faces this opening, and the boss 115 is used for mounting the electromagnetic clutch 114 on the rotation shaft 56.

An outer peripheral surface of the outer ring 80 has a flat cross section, and the outer peripheral surface is press-fitted into an inner peripheral surface of the shaft hole 18, thereby fixing the outer ring 80. Therefore, the outer ring 80 is not rotated or displaced relative to the front housing 12. A second ball groove 92 is formed in a substantially central portion of an inner peripheral surface of the outer ring 80. A cross section of the second ball groove is 92 recessed in a semicircular shape. The second ball groove 92 is disposed such that it is opposed to the first ball groove 88 of the inner ring 78, and a portion of the ball 82 is inserted into the second ball groove 92. A set of second groove portions 94a and 94b are formed in both sides of the second ball groove 92, the second groove portions 94a and 94b are recessed from the inner peripheral surface radially outward by predetermined depths, and open at the one side surface and the other side surface, respectively. Outer peripheral portions of the first and second seal rings 84 and 86 are inserted into the second groove portions 94a and 94b.

The plurality of balls 82 are provided along circumferential directions of the outer ring 80 and the inner ring 78 such that the balls 82 straddle the first ball groove 88 and the second ball groove 92.

The first seal ring (first seal member) 84 includes an outer edge 96 which is made of elastic material such as rubber and which is formed on the side of the outer periphery of the first seal ring 84, and an inner edge 98 which is made of elastic material and which is formed on the side of the inner periphery. The outer edge 96 and the inner edge 98 are bonded to each other through a bonding portion 100 which extends in the radial direction.

The outer edge 96 is fitted into and fixed to the second groove portion 94a on the side of one side surface of the outer ring 80 (direction of arrow B), the inner edge 98 is inserted into the first groove portion 90a, and the inner edge 98 is disposed such that it is in non-contact with a bottom wall of the first groove portion 90a. That is, the first seal ring 84 is disposed such that the inner edge 98 located radially inward is slightly separated from the inner ring 78.

The bonding portion 100 is disposed between the first groove portion 90a and the second groove portion 94a to cover a side portion of the ball 82.

Like the first seal ring 84, the second seal ring (second seal member) 86 includes an outer edge 102 which is made of elastic material such as rubber and which is formed on the side of the outer periphery, and an inner edge 104 which is made of elastic material and which is formed on the side of the inner periphery. The outer edge 102 and the inner edge 104 are bonded to each other through a bonding portion 106 which extends in the radial direction.

The outer edge 102 is fitted into and fixed to the second groove portion 94b on the side of the other side surface (direction of arrow A) of the outer ring 80, and the inner edge 104 is inserted into the first groove portion 90b and is disposed such that the inner edge 104 abuts against a bottom wall of the first groove portion 90b. The bonding portion 106 is disposed between the first groove portion 90b and the second groove portion 94b to cover a side portion of the ball 82.

A space between the outer ring 80 and the inner ring 78 which opens at the side of the first bearing 60 is covered with the first and second seal rings 84 and 86. This configuration prevents lubricant (e.g., grease) which lubricates the balls 82 provided therein from leaking outside.

The second seal ring 86 is provided such that the inner edge 104 thereof is in contact with the inner ring 78 and the inner edge 104 can tilt a predetermined angle around the outer edge 102 held by the outer ring 80 through the bonding portion 106. That is, as shown in FIG. 3B, the second seal ring 86 tilts only after predetermined pressure is applied thereto from an interior of the first bearing 60.

As shown in FIG. 1, a sealing member 108 which seals a gas suction chamber 107 is fitted onto an outer periphery of the shaft portion 58 at a location on the side of the bush 54 (direction of arrow B) with respect to the first bearing 60. For example, the sealing member 108 is made of elastic material such as rubber and formed into an annular shape.

A pulley 112 is attached to an outer periphery of the boss portion 16 in the front housing 12 through a third bearing 110. A rotation force is transmitted from a rotation driving source such as an engine (not shown) to the pulley 112 through a belt. The electromagnetic clutch 114 is turned ON/OFF, thereby transmitting the rotation force to the rotation shaft 56 or cutting the transmission of the rotation force to the rotation shaft 56, and thereby rotating the rotation shaft 56.

The scroll compressor 10 used as a compressor according to the embodiment basically has the above-described configuration. Operation and effect of the scroll compressor 10 will be described next.

First, if a rotation force is transmitted to the rotation shaft 56 under effect of the operation of the electromagnetic clutch 114, the support body 62 is rotated through the first bearing 60, and the crankpin 66 fixed to the support body 62 turns in a state where the crankpin 66 is eccentric to an axis of the rotation shaft 56. According to this, the bush 54 is rotated, and the movable scroll 28, which is slidably supported by the thrust plate 74, turns with respect to the fixed scroll 26.

Refrigerant gas supplied from the suction port 20 is introduced into the rear housing 14, and is introduced into the gas compression chamber 46 which is formed between the fixed-side scroll wall 32 of the fixed scroll 26 and the movable-side scroll wall 44 of the movable scroll 28. As the gas compression chamber 46 gradually advances from the outer peripheral portion toward the central portion, the refrigerant gas which is introduced into the gas suction chamber 107 is gradually compressed under the sealing effect of the seal member 48. Thereafter, the compressed gas is led out from the compressed gas lead-out hole 36 into the gas discharge chamber 34, and the compressed gas is discharged out into a refrigerant circulating system (not shown) through the discharge port 22.

At that time, an extremely small amount of refrigerant gas enters a space 116 on the side of the outer periphery of the shaft portion 58 and between the first bearing 60 and the sealing member 108 by rotation of the rotation shaft 56, the refrigerant gas is heated and expanded and pressure of the refrigerant gas becomes high in some cases. In this case also, the refrigerant gas flows into the first bearing 60 through a gap provided between the inner ring 78 and the inner edge 98 of the first seal ring 84 in the first bearing 60, and the refrigerant gas flows from the interior of the first bearing 60 toward the second seal ring 86. The second seal ring 86 is pressed outward (direction of arrow A) by the expanded high pressure refrigerant gas. According to this, as shown in FIG. 3B, the inner edge 104 tilts around the outer edge 102 to separate from a wall surface of the inner ring 78. According to this, the refrigerant gas is discharged outside of the front housing 12 from the shaft hole 18 through a gap between the inner edge 104 and the inner ring 78.

Figure 4:
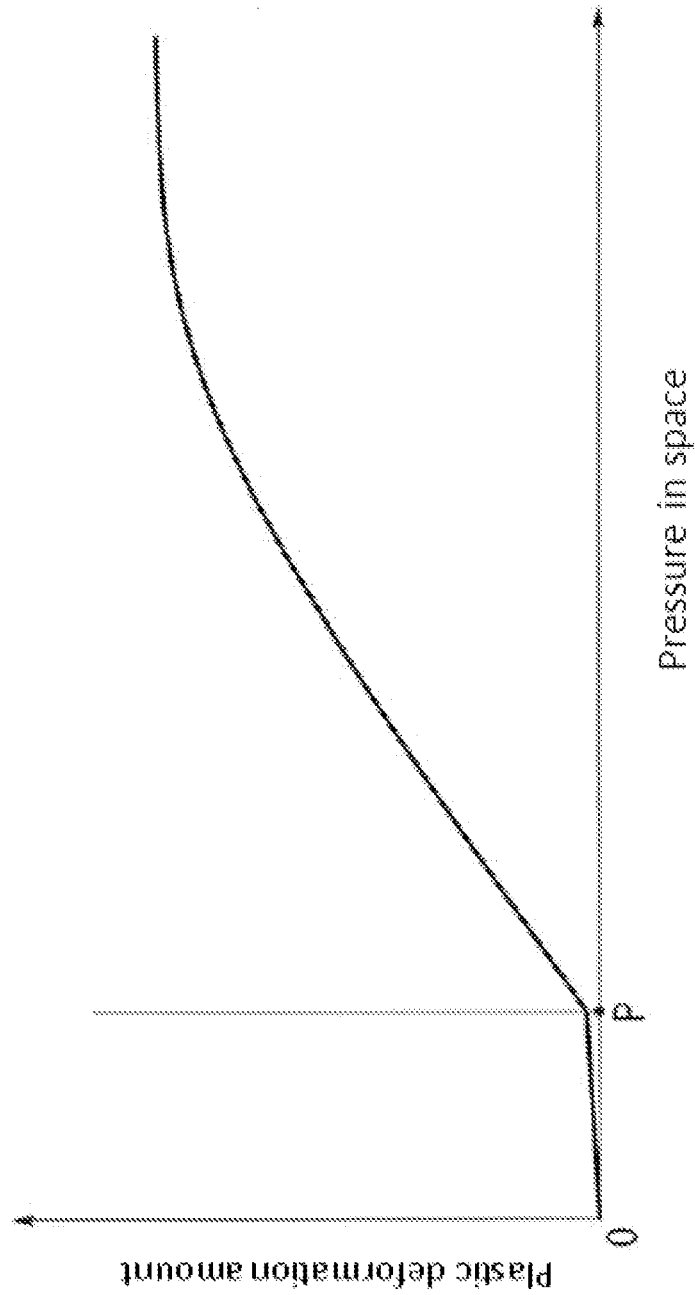
FIG. 4 is a characteristic curve diagram showing a relation between variation in pressure in a space and a plastic deformation amount of the second seal ring.

According to this, even when pressure of refrigerant gas which enters the space 116 on the side of an outer periphery of the shaft portion 58 becomes high, it is possible to discharge the refrigerant gas outside from the space 116 and to prevent the pressure in the space 116 from rising by making the refrigerant gas to flow into the first bearing 60 through the gap between the inner ring 78 and the inner edge 98 of the first seal ring 84 and then, by tilting the second seal ring 86 by pressure of the refrigerant gas, and by separating the inner edge 104 which abuts against the inner ring 78. Material and strength of the second seal ring 86 are set such that the second seal ring 86 tilts within such a range that inner pressure in the space 116 is $1/20$ to $1/5$ of elastic limit pressure P (see FIG. 4) of the second seal ring 86. More specifically, as will be understood from a characteristic curve which shows a relation between a composition deformation amount of the second seal ring 86 and pressure in the space 116 in FIG. 4, if the pressure exceeds the elastic limit pressure P of the second seal ring 86, the plastic deformation amount of the second seal ring 86 abruptly increases. Hence, the second seal ring 86 is tilted before the pressure reaches the elastic limit pressure P, thereby preventing the second seal ring 86 from being plastically deformed and from being damaged by the plastic deformation.

As a result, since it is possible to avoid a case where the first and second seal rings 84 and 86 fall out by a pressing force caused by pressure rise in the space 116, it is possible to reliably prevent the lubricant from leaking out from the first bearing 60 by the first and second seal rings 84 and 86, and it is possible to stably maintain the lubricating performance of the bearing by the lubricant. Since it is possible to prevent the lubricant from leaking out only by changing the shapes of the first and second seal rings 84 and 86, it is possible to inexpensively simplify the configuration.

It is possible to reliably prevent moisture and dust from entering from outside of the first bearing 60 by the first and second seal rings 84 and 86.

The boss 115 for mounting the electromagnetic clutch 114 on the rotation shaft 56 faces the opening of the first groove portion 90b, and the boss 115 functions as a shielding member for the first groove portion 90b. According to this, even if the second seal ring 86 tilts and opens for releasing pressure from the space 116, the configuration makes it more difficult for moisture and dust to enter from outside.

Further, since the first and second seal rings 84 and 86 are stably held in the first bearing 60, the durability of the first bearing 60 can be enhanced and as a result, it is possible to reliably support the rotation shaft 56 over the long term.

The compressor of the invention is not limited to the above-described embodiment, and various configurations can be employed without departing from the subject matter of the invention of course.

The invention claimed is:
1. A compressor, comprising:
a housing, a compressing portion which is provided inside the housing and which compresses a refrigerant, a rotation shaft which is connected to the compressing portion and which drives the compressing portion, a clutch unit connected to one end of the rotation shaft and which transmits or cuts off power to the rotation shaft, a boss portion provided in the housing on an axial side of the housing which is closest to the clutch unit, the boss portion including a hole into which the rotation shaft is inserted, a sealing member provided on the boss portion on an axial side of the boss portion which is closest to the compressing portion, the sealing member coming into contact with the rotation shaft and shielding the housing and the boss portion from each other, and a bearing which rotatably holds the rotation shaft with respect to the housing, the bearing including an outer ring provided on an axial end of the boss portion which is closest to the clutch unit, the outer ring being attached to the hole of the boss portion, an inner ring provided on an inner periphery of the outer ring and which abuts against an outer peripheral surface of the rotation shaft, a plurality of balls for rotatably supporting the inner ring with respect to the outer ring, provided between the outer ring and the inner ring, a first seal member provided between the outer ring and the inner ring, the first seal member being attached to an axial end surface of the bearing which is closest to the sealing member, and a second seal member provided between the outer ring and the inner ring, the second seal member being attached to an axial end surface of the bearing which is closest to the clutch unit, the second seal member being exposed to an outside of the housing, wherein the first seal member is always in non-contact with the inner ring and the second seal member is in contact with the inner ring when pressure in a space in the boss portion is lower than a predetermined value, and wherein, when pressure in the space in the boss portion is equal to or higher than the predetermined value, a portion of the second seal member closest to the inner ring tilts away from the housing and is not in contact with the inner ring.

2. The compressor according to claim 1, wherein a pressure in the boss portion when the portion of the second seal member radially closest to the inner ring tilts away from the housing is set within a range of $1/20$ to $1/5$ of an elastic limit pressure of the second seal member.

3. The compressor according to claim 1, further comprising a shielding member on the rotation shaft at a location closer to the clutch unit than the bearing, such that the shielding member faces a contact portion between the second seal member and the inner ring.

* * * * *